(12) United States Patent
Jaensch et al.

(10) Patent No.: US 11,660,975 B2
(45) Date of Patent: May 30, 2023

(54) AC CHARGING OF AN INTELLIGENT BATTERY

(71) Applicant: Dr. Ing. h.c. F. Porsche Aktiengesellschaft, Stuttgart (DE)

(72) Inventors: Malte Jaensch, Bietigheim-Bissingen (DE); Jan Kacetl, Gemmrigheim (DE); Tomas Kacetl, Gemmrigheim (DE); Stefan Götz, Forstern (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 1020 days.

(21) Appl. No.: 16/299,778

(22) Filed: Mar. 12, 2019

(65) Prior Publication Data

US 2019/0288547 A1 Sep. 19, 2019

(30) Foreign Application Priority Data

Mar. 19, 2018 (DE) .......................... 102018106305.9

(51) Int. Cl.
*B60L 58/19* (2019.01)
*B60L 53/60* (2019.01)
(Continued)

(52) U.S. Cl.
CPC .............. *B60L 58/19* (2019.02); *B60L 53/60* (2019.02); *H02J 7/00714* (2020.01);
(Continued)

(58) Field of Classification Search
CPC .... H02J 7/045; H02J 2310/48; H02J 7/00714; H02J 7/007182; H02J 7/04; H02J 7/027;
(Continued)

(56) References Cited

U.S. PATENT DOCUMENTS

| 9,114,794 B2 | 8/2015 | King et al. |
| 2008/0150471 A1* | 6/2008 | Unsworth ................. H02P 1/26 318/778 |

(Continued)

FOREIGN PATENT DOCUMENTS

| AT | 508279 A1 | 12/2010 |
| DE | 102010052934 A1 | 5/2012 |

(Continued)

OTHER PUBLICATIONS

Chinese Office Action for Chinese Application No. 201910197456.4, dated Nov. 4, 2022 with translation, 14 pages.

*Primary Examiner* — Paul Dinh
(74) *Attorney, Agent, or Firm* — RatnerPrestia

(57) ABSTRACT

A method for AC-charging an intelligent battery pack, which is connected to a charging column and has at least two battery modules, which each comprise at least one energy storage element and at least two power semiconductor switches, which interconnect the respective battery module in series or in parallel with another battery module. The battery pack is connected for charging with alternating current provided by the charging column by a charging circuit, which includes a filter and a rectifier. According to the method, a state of each individual energy storage element is monitored. In accordance with a continued evaluation of the states of the respective energy storage elements, a terminal voltage of the battery pack is adjusted by way of dynamic actuation of the power semiconductor switches to a voltage provided by the rectifier.

7 Claims, 6 Drawing Sheets

(51) Int. Cl.
*H02J 7/00* (2006.01)
*B60L 50/50* (2019.01)

(52) U.S. Cl.
CPC ......... *H02J 7/007182* (2020.01); *B60L 50/50* (2019.02); *H02J 2310/48* (2020.01)

(58) Field of Classification Search
CPC .. H02J 7/06; H02J 2007/0098; H02J 2007/10; B60L 53/60; B60L 50/50; B60L 53/62; B60L 58/12; B60L 58/19; Y02T 10/70; Y02T 10/7072; Y02T 90/12; Y02T 90/14
USPC ....................................................... 320/109
See application file for complete search history.

(56) References Cited

U.S. PATENT DOCUMENTS

2011/0001456 A1   1/2011  Wang
2018/0043789 A1*  2/2018  Goetz .................... B60L 50/64

FOREIGN PATENT DOCUMENTS

| DE | 102014204260 A1 | 9/2014 |
| TW | 201103220 A | 1/2011 |
| WO | 2012025256 A1 | 3/2012 |
| WO | 2016174117 A1 | 11/2016 |

* cited by examiner

AC CHARGING OF AN INTELLIGENT BATTERY

CROSS-REFERENCE TO RELATED APPLICATION

This application claims priority to German Patent Application No. DE 10 2018 106 305.9, filed Mar. 19, 2018, which is incorporated by reference herein in its entirety.

FIELD OF THE INVENTION

The present invention relates to a method and a system for charging an intelligent battery pack using alternating current, wherein the battery pack comprises a plurality of battery modules, which are each provided with at least two power semiconductor switches and at least one energy storage element.

BACKGROUND OF THE INVENTION

Batteries or battery packs conventionally installed in electric vehicles today are fixedly wired units, for example individual energy cells fixedly wired to one another, whose series-parallel configuration prescribed by the wiring cannot be changed. This means that the same voltage used for discharging, for example in a power inverter, is also used for charging. The fixed wiring determines a maximum voltage of the battery in the case of a full state of charge and without aging phenomena. If the state of charge drops, the voltage of the fixedly wired battery can decrease by up to 50%.

A battery is also not provided with further control components for DC charging as standard. A charging socket is connected directly to connection points of the battery or of the battery pack without any DC isolation, wherein a charging power is determined by a charging control. A conventional battery pack can thus be charged only by a controlled DC charge source at a prescribed voltage level, wherein 400 V and 800 V are typical voltage levels. If a rated voltage of the battery pack is higher than the maximum charging voltage of a charging column to be set, the battery pack cannot be charged.

In contrast, document WO 2012/025256 A1, which is incorporated by reference herein, demonstrates a drive system for a battery-operated vehicle, the grid connection circuit of which makes it possible for the vehicle to be connected to different grid voltages. In this case, the battery voltage can be below or above a rectified grid voltage. Power from the battery of the vehicle can also be both drawn from and fed into the grid connection. The grid connection circuit has a plurality of inductors and intermediate circuits for this purpose.

With respect to the conventional implementations of a battery pack, modifications of the fixed wiring of the energy cells are also known. For example, document WO 2016/174117 A1, which is incorporated by reference herein, discloses a battery for an electric vehicle having at least two battery modules, which each comprise at least one battery cell and two electrical switches, wherein a dynamic change of the interconnection of the battery modules is made possible by way of the electrical switches. An additionally present rectifier can generate an output voltage having a reduced voltage ripple or current ripple.

In order to charge a conventional battery pack with alternating current, it is necessary to convert the power provided by the alternating current. A component located on the battery pack, referred to as a charger or OBC (on-board charger), converts the alternating current input to a direct current by means of a diode or an active rectifier. An electric circuit for power factor correction, shortened to PFC, which ensures a power factor of one, can follow the charger. In order to bring about DC isolation, the OBC is provided with an LLC resonant converter as standard, that is to say a resonant converter determined by a transformer magnetizing inductance, a transformer leakage inductance and a capacitor capacitance. A magnitude of a magnetic oscillating circuit is minimized by a high frequency of a resonant circuit. The OBC can be provided with various filters, which are located either on the AC side or on the DC side. However, the need to install an OBC together with a conventional battery increases the complexity and costs of the entire system. Moreover, the OBC represents a bulky electronic component that increases the weight of the vehicle.

SUMMARY OF THE INVENTION

Against this background, described herein is a method for AC-charging a battery pack, in which a charging circuit can be designed in a significantly simpler and hence lighter, more space-saving and more cost-effective manner compared to the prior art. Also described is a corresponding system for carrying out such a method.

More particularly, described herein is a method for AC-charging an intelligent battery pack, which is connected to a charging column and has at least two battery modules, is proposed, in which a respective battery module comprises at least one energy storage element and at least two power semiconductor switches, which interconnect the respective battery module in series or in parallel with another battery module, and in which the battery pack is connected for charging using alternating current provided by the charging column by means of a charging circuit, which comprises a filter and a rectifier, and a state of each individual energy storage element is monitored, wherein, in accordance with a continued evaluation of the states of the respective energy storage elements, a terminal voltage of the battery pack is adjusted by way of dynamic actuation of the power semiconductor switches to a voltage provided by the rectifier. The state of an energy storage element can in this case be formed, for example, by the state of charge thereof, and/or by the charge flowing to it, and/or by the temperature thereof. By setting the terminal voltage, the charging current is controlled at the same time.

The intelligent battery pack can actively set a terminal voltage between 0 V (no battery module connected) and a maximum voltage (all of the battery modules connected in series) by way of a respective series-parallel interconnection of the battery modules thereof among one another. In addition, beyond the terminal voltage resulting from a series or parallel interconnection or possible combination thereof, an arbitrary value of 0 V up to the maximum voltage resulting on average over time can be produced by way of high-frequency switchover or connection and disconnection of individual battery modules. The setting is carried out by a charging controller, which controls the series-parallel interconnection of the battery modules taking into account the states of the energy storage elements in such a way that the function of a power factor correction is carried out and the electric circuit present in conventional OBCs relating thereto is omitted, as a result of which the charging circuit provided in accordance with the invention has a lower space requirement and lower production costs than a conventional OBC.

A further advantage of the method according to aspects of the invention is that demands on a DC voltage ripple of the charging current applied to the battery pack can be defined within greater limits than in the case of a conventional battery. A DC voltage ripple of the charging current provided by the rectifier may be determined, for example, by high-frequency fluctuations (ripple) of the alternating current provided by the charging column. The charging controller that carries out the method according to aspects of the invention ascertains this by way of measurement apparatuses, which measure the charging voltage and/or the charging current, and reacts thereto by continued variation of the series-parallel interconnection of the battery modules and the terminal voltage that changes as a result thereof, in order to provide at any given moment optimum charging conditions, such as, for example, a lower or equal terminal voltage compared to the charging voltage.

In one embodiment of the method according to aspects of the invention, the filter suppresses an inrush current brought about by a voltage difference of the battery pack and the charging column. The voltage difference can arise, for example, due to a changing charging current of an uncontrolled charging column or at the moment of connection of the charging circuit to the charging column. Here, the filter also has the task of filtering out instances of electromagnetic interference.

In one embodiment of the method according to aspects of the invention, a charging power is controlled by way of the dynamic actuation of the power semiconductor switches. In addition to the information about the states of the energy storage elements, the values of a charging voltage and a charging current are also provided to the charging controller, whereby the charging controller actuates the power semiconductor switches of the battery pack in accordance with aspects of the invention in such a way that a prescribed value of a charging power formed from the product of the charging voltage and the charging current is retained.

In one embodiment of the method according to aspects of the invention, surge currents are prevented by means of a phase-locked loop connected to the charging column. A surge current can arise, for example, when the motor vehicle is connected to the charging column. The phase-locked loop is connected to the charging controller by the motor vehicle, which charging controller prevents, by way of the dynamic actuation of the power semiconductor switches of the battery pack, the terminal voltage from deviating from an absolute value of the charging voltage.

A system for AC-charging an intelligent battery pack, which is connected or can be connected to a charging column and which has at least two battery modules, which each comprise at least two power semiconductor switches and at least one energy storage element, is also described, wherein the system comprises a charging circuit, which comprises a filter and a rectifier, a measurement apparatus associated with each battery module, which measurement apparatus is configured for measuring a flowing charging current, at least one temperature sensor in the battery pack, a measurement apparatus, which is configured for measuring a charging voltage, and a measurement apparatus, which is configured for measuring a charging current, and wherein the system comprises a charging controller, which is provided with a computer processor and a computer program running on the computer processor and which is configured for actuating power semiconductor switches, wherein the charging controller is configured to read out information about states of the energy storage elements from the at least one temperature sensor and the measurement apparatuses.

Due to the installed sensors, in particular the at least one temperature sensor, and the measurement apparatuses, the necessary information for interconnecting the respective battery module in series or in parallel with other battery modules in accordance with the state of a respective battery module and thus for carrying out a method described above is available to the computer processor and to the computer program running thereon and hence to the charging controller. This constitutes an intelligence of the battery pack.

In one configuration of the system according to aspects of the invention, the rectifier of the charging circuit comprises at least two diodes. A diode is a passive electrical component, which, although it is cost-effective, cannot be used to implement rectification very efficiently.

In a further configuration of the system according to aspects of the invention, the rectifier of the charging circuit comprises at least two semiconductor switches, for example insulated-gate field-effect transistors. These may be, for example, what are known as MOSFETs or IGBTs, which represent an active electrical component. This increases the efficiency but also the complexity of the charging circuit.

In another further configuration of the system according to aspects of the invention, the rectifier of the charging circuit comprises a combination of diodes and insulated-gate field-effect transistors, that is to say of passive and active electrical components. An optimum combination with respect to the greatest efficiency with the lowest complexity can be formed therefrom. Passive electronic components are advantageously used at the neutral conductor, which is used, for example, during charging with single-phase current.

In one configuration of the system according to aspects of the invention, an electric circuit for DC-isolating the battery pack from the connection to the charging column is additionally comprised. A direct electrical line between an electric circuit of the charging column and an electric circuit of the intelligent battery pack is precluded thereby. An electrical potential of the respective electric circuit is isolated from the respective other one.

In a further configuration of the system according to aspects of the invention, the system comprises a phase-locked loop for the charging column. A surge current, which can arise, for example, when the motor vehicle is connected to the charging column, is counteracted by means of the phase-locked loop connected to the charging column.

In a further configuration of the system according to aspects of the invention, a polyphase rectifier is comprised by the charging circuit. The intelligent battery pack can thus also be charged at charging columns that provide a polyphase alternating current, for example a three-phase current. A respective electric circuit consisting of diodes and/or MOSFETs or IGBTs is advantageously present in the polyphase rectifier for a plurality of phases, as a result of which there is sufficient complexity, together with the neutral conductor, to connect any number of phases provided by the charging column.

Finally, in one configuration of the system according to aspects of the invention, the rectifier of the charging circuit is used, after the termination of the charging, to generate an alternating current from the direct current provided by the intelligent battery pack for operation of an electric motor.

BRIEF DESCRIPTION OF THE DRAWING

Further advantages and configurations of the invention emerge from the description and from the appended drawing.

It is self-evident that the features mentioned above and the features yet to be discussed below may be used not only in the respectively specified combination but also in other combinations or individually without departing from the scope of the present invention.

The figures are described cohesively and comprehensively and the same components are assigned to the same reference symbols.

FIG. 1 shows a schematic illustration in accordance with the prior art of a charger for AC-charging a battery.

FIG. 2 shows a schematic illustration of an embodiment of a charging circuit, provided in accordance with aspects of the invention, of a battery pack at a charging column.

FIG. 3 shows a schematic illustration of circuit diagrams for a plurality of rectifiers from another embodiment of a charging circuit provided in accordance with aspects of the invention.

FIG. 4 shows a schematic illustration of circuit diagrams for a plurality of filters from a further embodiment of a charging circuit provided in accordance with aspects of the invention.

FIG. 5 shows a schematic illustration of voltage profiles at various electronic components of a still further embodiment of the charging circuit provided in accordance with aspects of the invention.

FIG. 6 shows a schematic illustration of an embodiment of a structure according to aspects of the invention for charging an intelligent battery pack at a charging column.

DETAILED DESCRIPTION OF THE INVENTION

Figure 1:
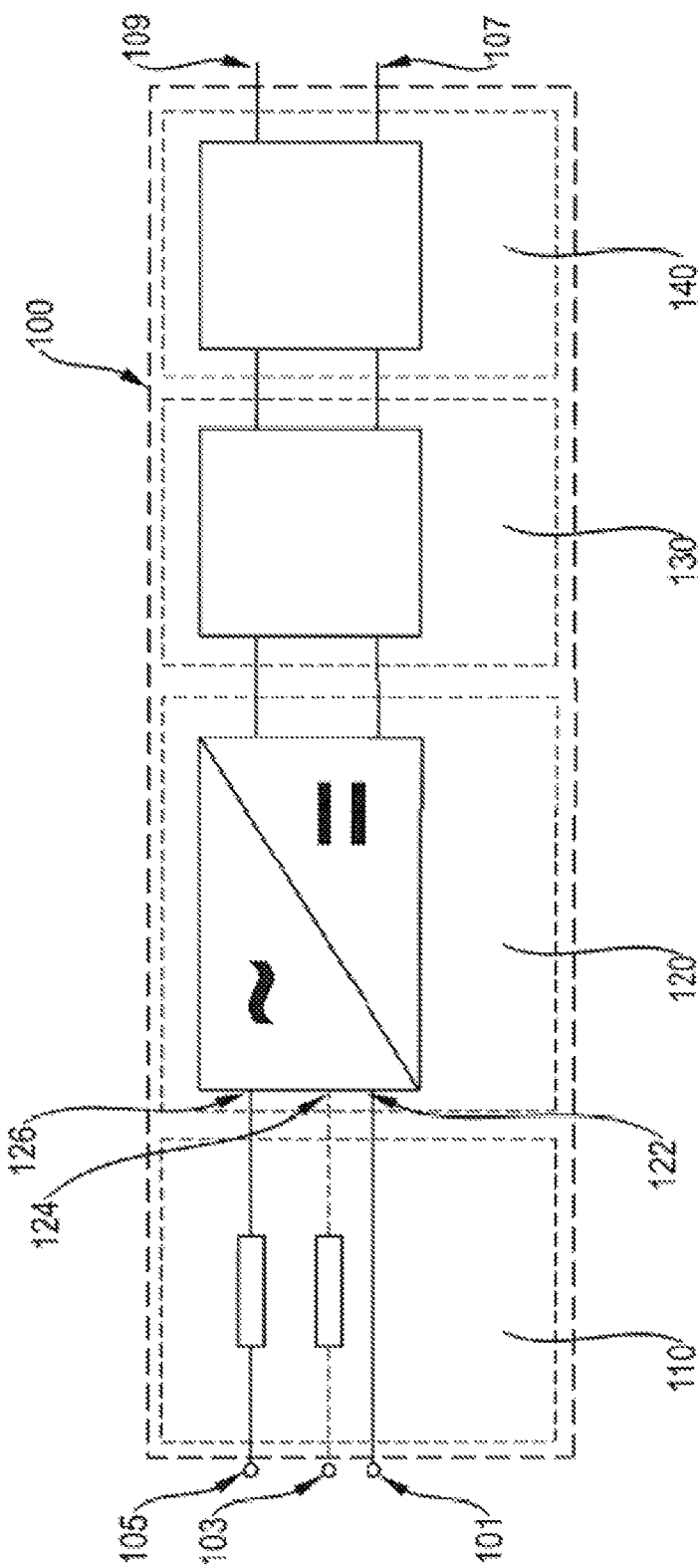

FIG. 1 shows a schematic illustration in accordance with the prior art of a charger 100 or else OBC, short for on-board charger, for AC-charging a battery. The charger 100 is connected to a charging column by way of the neutral conductor 101, that is to say ground potential, and a first phase 105 and, in a manner representative of further phases, by way of the phase 103 and provides a direct current to a terminal connection of a battery via two connections 107 and 109. A charger 100 that is conventional according to the prior art consists of a filter 110 for filtering out instances of electromagnetic interference (EMI), a rectifier 120, which rectifies, for example, by means of diodes, a power factor correction means 130, usually denoted by PFC, and a resonant converter 140, for example an LLC resonant converter, which DC-isolates an electric circuit and a potential of the charging column from an electric circuit and a potential of the battery. Ground potential 122 is applied to the input of the rectifier 120 and a first phase 126 coming from the filter 110 and, optionally representing further phases and therefore illustrated using dashes, a further phase 124, likewise coming from the filter 110.

Figure 2:
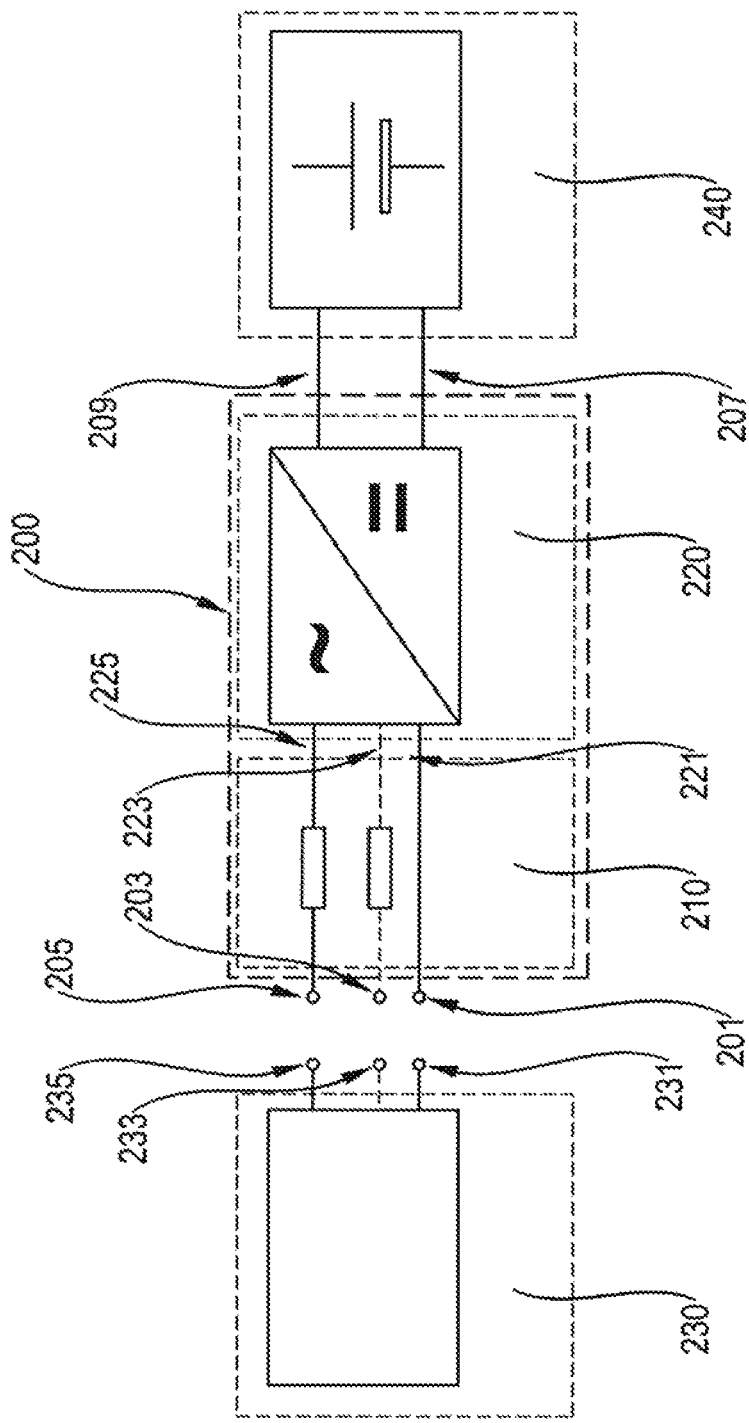

FIG. 2 shows a schematic illustration of an embodiment of a charging circuit 200, provided in accordance with aspects of the invention, of an intelligent battery pack 240 at a charging column 230. The charging column 230 provides a zero potential 231, that is to say ground potential, and a first phase 235 of an alternating current, as well as possible further phases 233, for charging with alternating current. The intelligent battery pack 240 expects charging with direct current at the terminal connection 207, 209 thereof. The direct current is provided by the charging circuit 200, the input of which is connected to the charging column 230 by way of ground potential 201, a first phase 205 and possible further phases 203. The charging circuit 200 provided in accordance with aspects of the invention comprises just one filter 210 and one rectifier 220 if DC isolation of the respective electric circuits of the charging column/battery pack can be omitted. Owing to the series-parallel interconnection options, the intelligent battery pack 240 can adjust the terminal voltage thereof by means of a charging controller provided in accordance with aspects of the invention to the charging voltage provided by the rectifier 220 at the terminal connection 207, 209, as a result of which a power factor correction means 130 from the prior art mentioned in FIG. 1 is omitted or can be omitted.

Figure 3:
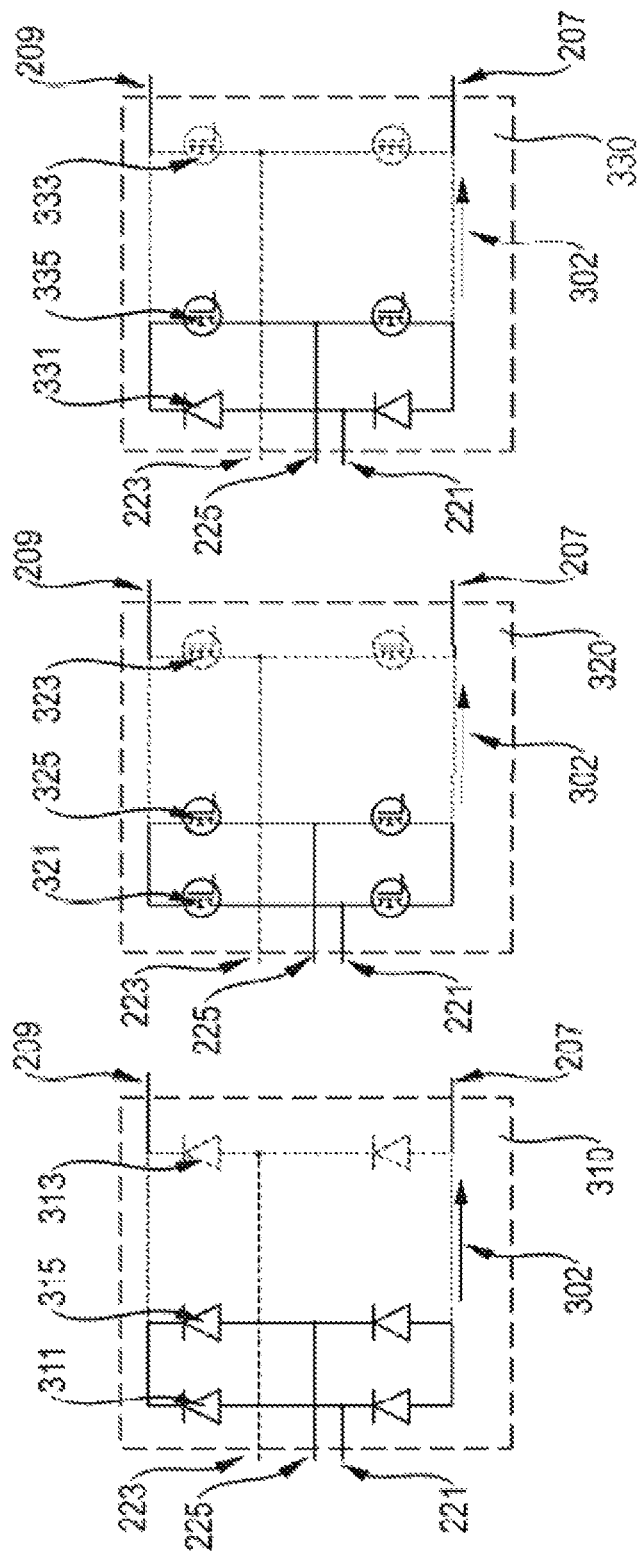

FIG. 3 shows a schematic illustration of circuit diagrams for a plurality of rectifiers 310, 320, 330 from one embodiment of a charging circuit provided in accordance with aspects of the invention. Ground potential, that is to say a neutral conductor 221, a first phase 225 and possible further phases 223 coming from the filter are applied to the input of the respective rectifier 310, 320, 330. At the output, the respective rectifiers 310, 320, 330 deliver a DC voltage to the terminal connection 207, 209 of the battery pack. The rectifier 310 using passive electronic components is realized having branches 311, 315 each consisting of two diodes and, representative of further branches shown using dashes, having a branch 313, which branches are respectively connected to the neutral conductor 221, a first phase 225 and further phases 223. The rectifier 320 using active electronic components is realized having branches 321, 325 each consisting of two MOSFETs or IGBTs and, representative of further branches shown using dashes, having a branch 323, which branches are respectively connected to the neutral conductor 221, a first phase 225 and further phases 223. The rectifier 330 using a combination of passive and active electronic components is realized having a branch 331 consisting of two diodes, a first branch 335 consisting of two MOSFETs or IGBTs and, representative of further branches each consisting of two MOSFETs or IGBTs shown using dashes, having a branch 333, which branches are respectively connected to the neutral conductor 221, a first phase 225 and further phases 223.

Figure 4:
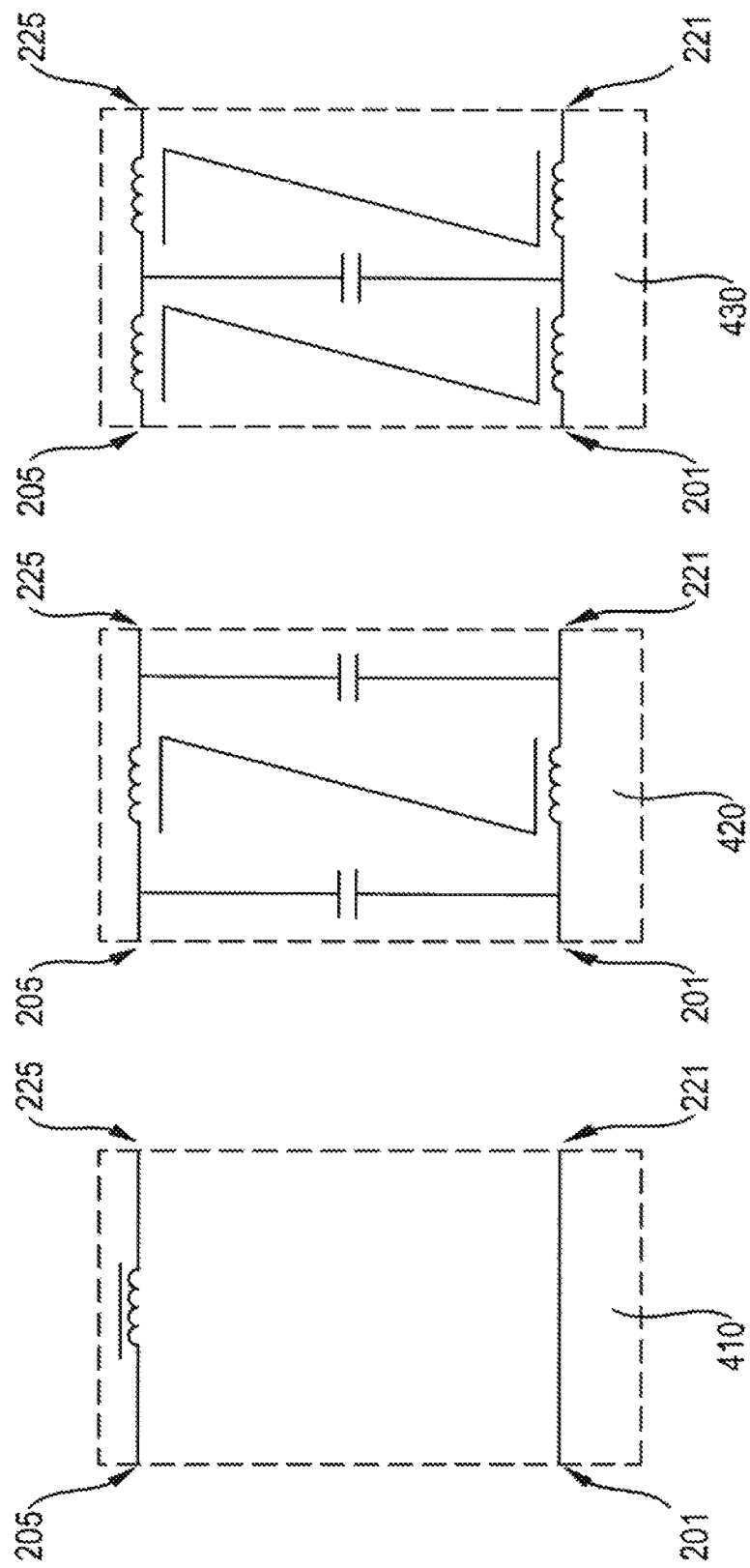

FIG. 4 shows a schematic illustration of circuit diagrams for a plurality of filters 410, 420, 430 from one embodiment of a charging circuit provided in accordance with aspects of the invention. The circuit diagrams are illustrated by way of example only for a single-phase alternating current, but without limiting the method according to aspects of the invention to a single-phase alternating current. The neutral conductor 201 and a phase 205 coming from the connection to the charging column are applied to the input of a respective filter 410, 420, 430. The neutral conductor 221 and the phase 225 are accordingly found at the output to the rectifier. Instances of electromagnetic interference are filtered out of a phase signal and possible inrush currents are suppressed by means or the filter 410, which represents an L filter, or the filter 420, which represents a CLC filter, or the filter 430, which represents an LCL filter.

Figure 5:
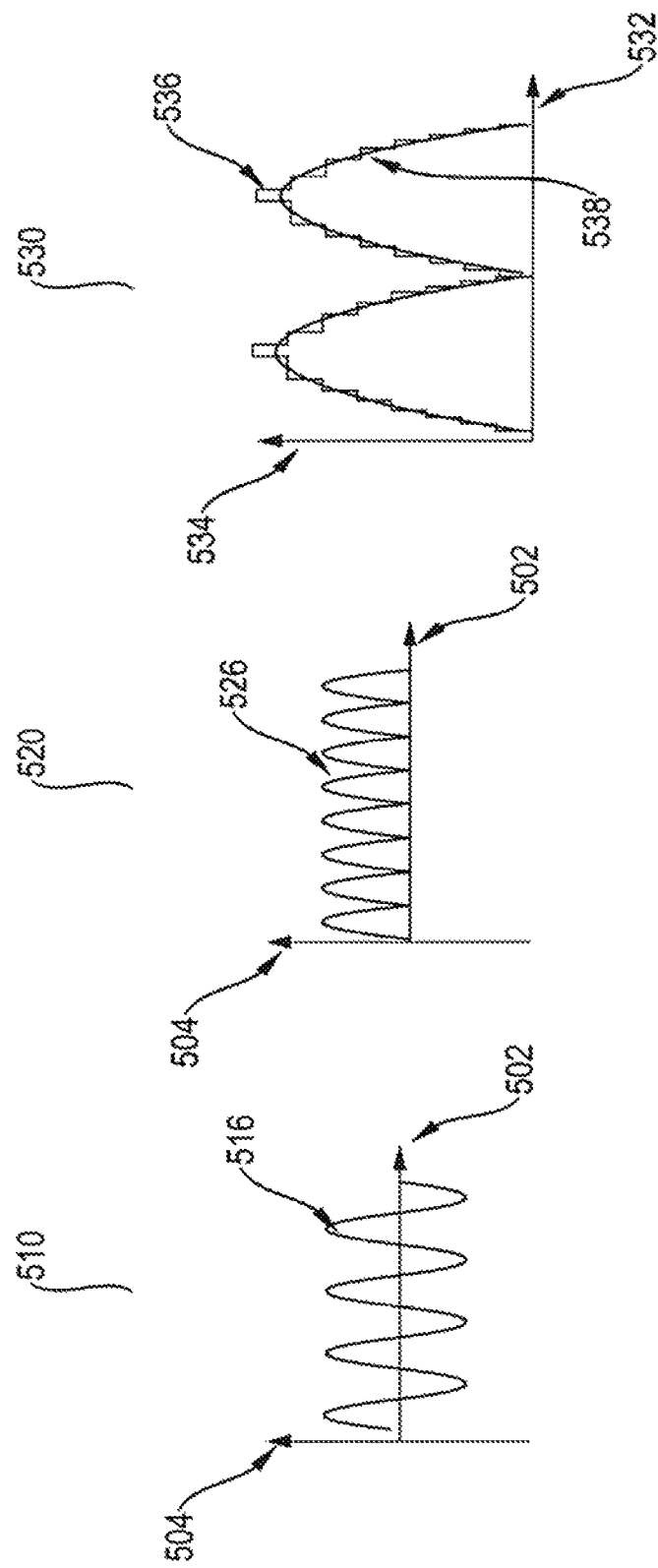

FIG. 5 shows a schematic illustration of voltage profiles at various electronic components of one embodiment of the charging circuit according to aspects of the invention. A voltage profile 516 provided by the charging column is illustrated in graph 510. A time axis 502 runs toward the right and a voltage value axis 504 runs upward; both are in arbitrary units. The same scale is also used in graph 520, which shows an output voltage 526 of a rectifier now having just positive voltage values. The profile of the output voltage 526 is reproduced by the dynamic interconnection of the intelligent battery pack in graph 530 in order to create optimum charging conditions. For the purpose of better illustration, the time axis 532 and the voltage value axis 534 are illustrated here in enlarged fashion compared to the graphs 510 and 520. Temporally short voltage differences, which are averaged out over time, arise between the profile 538 prescribed by the output voltage of the rectifier and the terminal voltage 536 of the battery pack.

Figure 6:
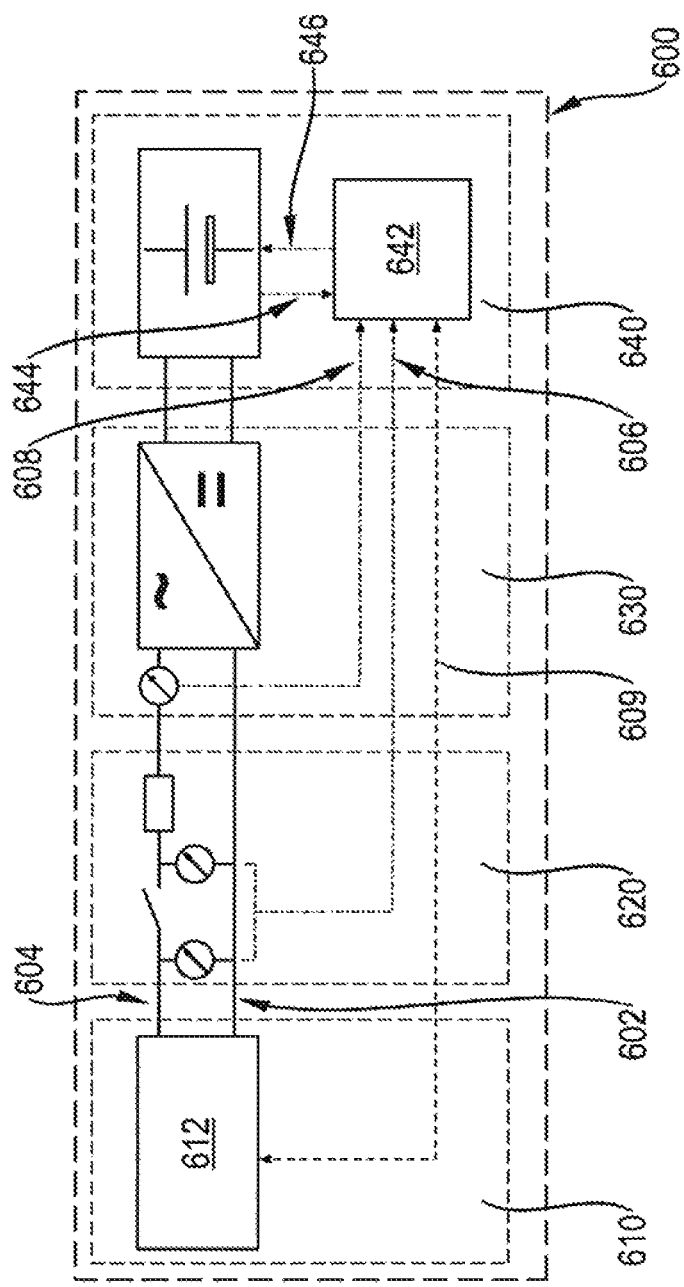

FIG. 6 shows a schematic illustration of an embodiment of a structure 600 according to aspects of the invention for charging an intelligent battery pack 640 at a charging column 610. An alternating current connection 612 of the charging column 610 is connected to the filter 620 by way of the neutral conductor 602 and the phase 604. Measurement apparatuses that measure a voltage 606 are located at the input to the filter 620. Depending on the position of the switch in the filter 620, the voltage of the alternating current connection 612 (switch position open) or the charging voltage (switch position closed) is measured. A measurement apparatus for measuring the charging current 608 is located at the input to the rectifier 630. The values of the voltage 606 and of the charging current 608 are available to the charging controller 642. Furthermore, the charging controller 642 receives information 644 from the battery pack about states of charge and the temperature of the individual energy storage elements. Based on all of this information, the charging controller 642 controls the interconnection of the battery modules in the battery pack, that is to say the terminal voltage produced at the battery pack, and hence the charging 646 of the battery pack. Moreover, a communication line 609 between the alternating current connection 612 of the charging column 610 and the charging controller 642 is shown here, which communication line can be realized, for example, by way of a vehicle-to-grid communication system. This makes a phase-locked loop possible, using which the charging controller 642 counteracts a surge current, which can arise, for example, when the motor vehicle is connected to the charging column 610, by changing the interconnection in the battery pack and changing the terminal voltage depending thereon.

What is claimed is:

1. A method for AC-charging an intelligent battery pack, which is connected to a charging column and has at least two battery modules, which each comprise at least one energy storage element and at least two power semiconductor switches, which interconnect the respective battery module either in series or in parallel with another battery module, in which the battery pack is connected for charging with alternating current provided by the charging column by way of a charging circuit, which comprises a filter and a rectifier, the method comprising:

measuring a charging voltage and a charging current;

monitoring a state of each individual energy storage element;

continuously evaluating the states of the respective energy storage elements based on the measured charging voltage and the measured charging current; and adjusting a terminal voltage of the battery pack by dynamically actuating the power semiconductor switches to a voltage provided by the rectifier in accordance with the continuous evaluation of the states of the respective energy storage elements.

2. The method as claimed in claim 1, further comprising suppressing an inrush current brought about by a voltage difference between the battery pack and the charging column using the filter.

3. The method as claimed in claim 1, further comprising controlling a charging power by way of the dynamic actuation of the power semiconductor switches.

4. The method as claimed in claim 1, further comprising preventing surge currents using a phase-locked loop connected to the charging column.

5. The method as claimed in claim 1, further comprising performing a power factor correction without an electric circuit for power factor correction.

6. The method as claimed in claim 1, further comprising reproducing an output voltage profile prescribed by the rectifier by a dynamic interconnection of the battery pack in order to create optimum charging conditions at any given moment.

7. The method as claimed in claim 6, further comprising averaging out over time of temporally short voltage differences which arise between the output voltage profile prescribed by the rectifier and the terminal voltage of the battery pack.

* * * * *